United States Patent
Mathew et al.

(10) Patent No.: US 11,063,872 B2
(45) Date of Patent: Jul. 13, 2021

(54) SCALABLE OVERLAY MULTICAST ROUTING

(71) Applicant: VMware, Inc., Palo Alto, CA (US)

(72) Inventors: Subin Cyriac Mathew, San Jose, CA (US); Sami Boutros, Union City, CA (US); Stephen Tan, Palo Alto, CA (US); Senthilkumar Karunakaran, Santa Clara, CA (US); Chidambareswaran Raman, Campbell, CA (US)

(73) Assignee: VMware, Inc., Palo Alto, CA (US)

(*) Notice: Subject to any disclaimer, the term of this patent is extended or adjusted under 35 U.S.C. 154(b) by 76 days.

(21) Appl. No.: 16/662,400

(22) Filed: Oct. 24, 2019

(65) Prior Publication Data
US 2021/0126866 A1    Apr. 29, 2021

(51) Int. Cl.
| H04L 12/18 | (2006.01) |
| H04L 12/46 | (2006.01) |
| H04L 12/24 | (2006.01) |
| H04L 29/08 | (2006.01) |
| H04L 12/803 | (2013.01) |
| H04L 12/801 | (2013.01) |
| H04L 12/733 | (2013.01) |
| H04L 12/66 | (2006.01) |

(52) U.S. Cl.
CPC .......... H04L 47/125 (2013.01); H04L 12/185 (2013.01); H04L 12/1886 (2013.01); H04L 12/4633 (2013.01); H04L 12/66 (2013.01); H04L 45/20 (2013.01); H04L 47/17 (2013.01)

(58) Field of Classification Search
CPC ..... H04L 47/125; H04L 47/17; H04L 12/185; H04L 12/1886; H04L 12/4633; H04L 12/66; H04L 45/20
See application file for complete search history.

(56) References Cited

U.S. PATENT DOCUMENTS

| 7,885,233 | B2* | 2/2011 | Nagarajan | H04L 12/1886 370/331 |
| 9,794,079 | B2* | 10/2017 | Tessmer | H04L 12/18 |
| 10,218,523 | B2* | 2/2019 | Boutros | H04L 12/185 |
| 10,484,303 | B2* | 11/2019 | Shepherd | H04L 12/184 |
| 10,523,455 | B2* | 12/2019 | Boutros | H04L 45/16 |
| 10,567,187 | B2* | 2/2020 | Mathew | H04L 12/1886 |
| 10,778,457 | B1* | 9/2020 | Mathew | H04L 12/185 |

* cited by examiner

*Primary Examiner* — Rasheed Gidado
(74) *Attorney, Agent, or Firm* — Patterson + Sheridan, LLP

(57) ABSTRACT

The disclosure provides an approach for reducing congestion within a network, the network comprising a plurality of subnets, the plurality of subnets comprising a plurality of host machines and a plurality of virtual computing instances (VCIs) running on the plurality of host machines. Embodiments include receiving, by an edge services gateway (ESG) of a first subnet of the plurality of subnets, membership information for a group identifying a subset of the plurality of host machines. Embodiments include receiving a multicast packet directed to the group and selecting from the plurality of host machines, a replicator host machine for the multicast packet. Embodiments include sending, to the replicator host machine, the multicast packet along with metadata indicating that the replicator host machine is to replicate the multicast packet to remaining host machines of the subset of the plurality of host machines identified in the membership information for the group.

20 Claims, 4 Drawing Sheets

SCALABLE OVERLAY MULTICAST ROUTING

BACKGROUND

Multicast is the delivery of a message or information, such as a packet, to a group of destination computers simultaneously in a single transmission from a source over a network. According to some techniques, copies of the packet are automatically replicated and forwarded by other network elements. Forwarding and replicating multicast packets are usually done by intermediate nodes in the network-switches fulfill multicast forwarding inside a layer 2 network while (multicast) routers fulfill multicast routing across layer 3 networks.

Many Internet protocol (IP) multicast applications have been developed and deployed, like financial software, video service, etc. A use case worth noting is overlay based network virtualization (layer 2 tunneling), with virtual extensible local area network (VXLAN) being an important technology. VXLAN can support a large number of logical layer 2 networks over a physical IP network. As a result, a large number of multicast groups may be consumed, especially in a cloud environment in which each tenant may create a number of logical networks. These created logical networks and corresponding multicast groups may span across physical layer 3 networks and even datacenters. Other tunneling protocols, besides VXLAN, may also be used, such as Stateless Transport Tunneling (STT), Generic Network Virtualization Encapsulation (GENEVE), or Generic Routing Encapsulation (GRE).

In virtualized computing systems, host machines generally host a plurality of virtual computing instances (VCIs), such as virtual machines (VMs), containers, etc. Though certain aspects are discussed with respect to VMs, it should be noted they may similarly apply to other types of VCIs. In hosting virtual machines, a host machine may provide a virtual switch that connects virtual machines running on the host to communicate with other virtual machines hosted on the same host machine as well as virtual machines hosted on other hosts. For example, the virtual machines may be interconnected as part of a logical overlay network. Logical overlay networks may be implemented by the host by encapsulating egress packets from the virtual machines and decapsulating ingress packets. For example, VXLAN tunnel endpoint (VTEP) services for encapsulating packets may be implemented at each host or at a gateway. Edge VTEPs or hypervisor-based VTEPs are generally connected to virtual switches implemented by the hypervisor for virtual machines on the same physical host. While the term "VTEP" refers to "VXLAN" tunneling protocol, it is now often used regardless of the tunneling protocol. The host may use internally-maintained forwarding tables that are populated by a control plane for determining whether to encapsulate packets and the targets of the encapsulation header based on the destination address of the original packet's header. In some cases, one or more overlay multicast groups may be mapped to an underlay multicast group, similarly to the way virtual addresses are mapped to physical addresses in the functioning of virtual memory within conventional operating systems.

Receiver endpoints of physical ("underlay") networks may be physical endpoints, such as host computers. Receiver endpoints of logical ("overlay") multicast groups may be virtual machines (VMs) or processes running on VMs. A gateway device may be implemented as a physical gateway appliance or as a virtual computing instance (VCI) on a host (e.g., also referred to as an edge services gateway (ESG) VCI or edge VM), and the gateway device generally receives all traffic from outside a given logical network, such as multicast packets from another logical network or another data center. When a gateway device receives a multicast packet from outside of the logical network directed to a multicast group including VMs within the logical network, it generally replicates the multicast packet to other hosts in the logical network.

Inefficiencies may arise in the placement of VMs that are part of a multicast group. The VMs of a multicast group may be distributed among subnets and hosts of a network in a suboptimal manner. For example, multiple subnets may receive multicast messages for only a few VMs within each subnet, increasing congestion within the network. In another example, hosts that are not part of a multicast group may receive a multicast message for that group, only to ignore the message. This wastes host resources and also increases network congestion. Furthermore, the gateway device of the logical network can become saturated because it is the single point of entry for the logical network and often must replicate multicast packets to a large number of hosts.

SUMMARY

Embodiments provide a method of reducing congestion within a network comprising a plurality of subnets, the plurality of subnets comprising a plurality of host machines and a plurality of virtual computing instances (VCIs) running on the plurality of host machines. Embodiments include: receiving, by an edge services gateway of a first subnet of the plurality of subnets, membership information for a group, wherein the membership information identifies a subset of the plurality of host machines; receiving, by the edge services gateway, a multicast packet directed to the group; selecting, by the edge services gateway, from the plurality of host machines, a replicator host machine for the multicast packet; and sending, by the edge services gateway, to the replicator host machine, the multicast packet along with metadata indicating that the replicator host machine is to replicate the multicast packet to remaining host machines of the subset of the plurality of host machines identified in the membership information for the group by, for each given subnet of the plurality of subnets that contains a remaining host machine of the remaining host machines, sending the multicast packet to at least one given host machine of the plurality of host machines that is located in the given subnet.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for reducing congestion within a network, particularly at an edge services gateway (ESG). In certain embodiments, upon receiving a multicast packet directed to a multicast group that includes endpoints within the network, an ESG selects a host within the network as a replicator. For example, the ESG may select a host as the replicator based on one or more of a variety of factors including distance between the host and the ESG, load on the host, whether the host runs any VMs that are members of the multicast group, and/or the like. The ESG then sends the multicast packet to the host selected as a replicator along with an indication that the host is to replicate the multicast packet to other hosts in the network with VMs in the multicast group. For example, the indication may be included in a header with which the ESG encapsulates the multicast packet, and the multicast packet may be sent via unicast to the host.

The replicator host then replicates the multicast packet, such as by sending the multicast packet to hosts designated as receiving hosts for multicast traffic at each subnet within the network that includes an endpoint belonging to the multicast group. For example, if a plurality of subnets include hosts with VMs in the multicast group, the replicator host may send the multicast packet to one respective host within each respective subnet of the plurality of subnets, and the respective host will then replicate the multicast packet to other hosts in the respective subnet that include VMs in the multicast group. As such, the ESG only sends each multicast packet it receives to one host that is selects as a replicator, thereby reducing congestion at the ESG. Furthermore, the ESG may select different hosts as replicators for different multicast packets in order to spread the load more evenly throughout the network.

Figure 1:
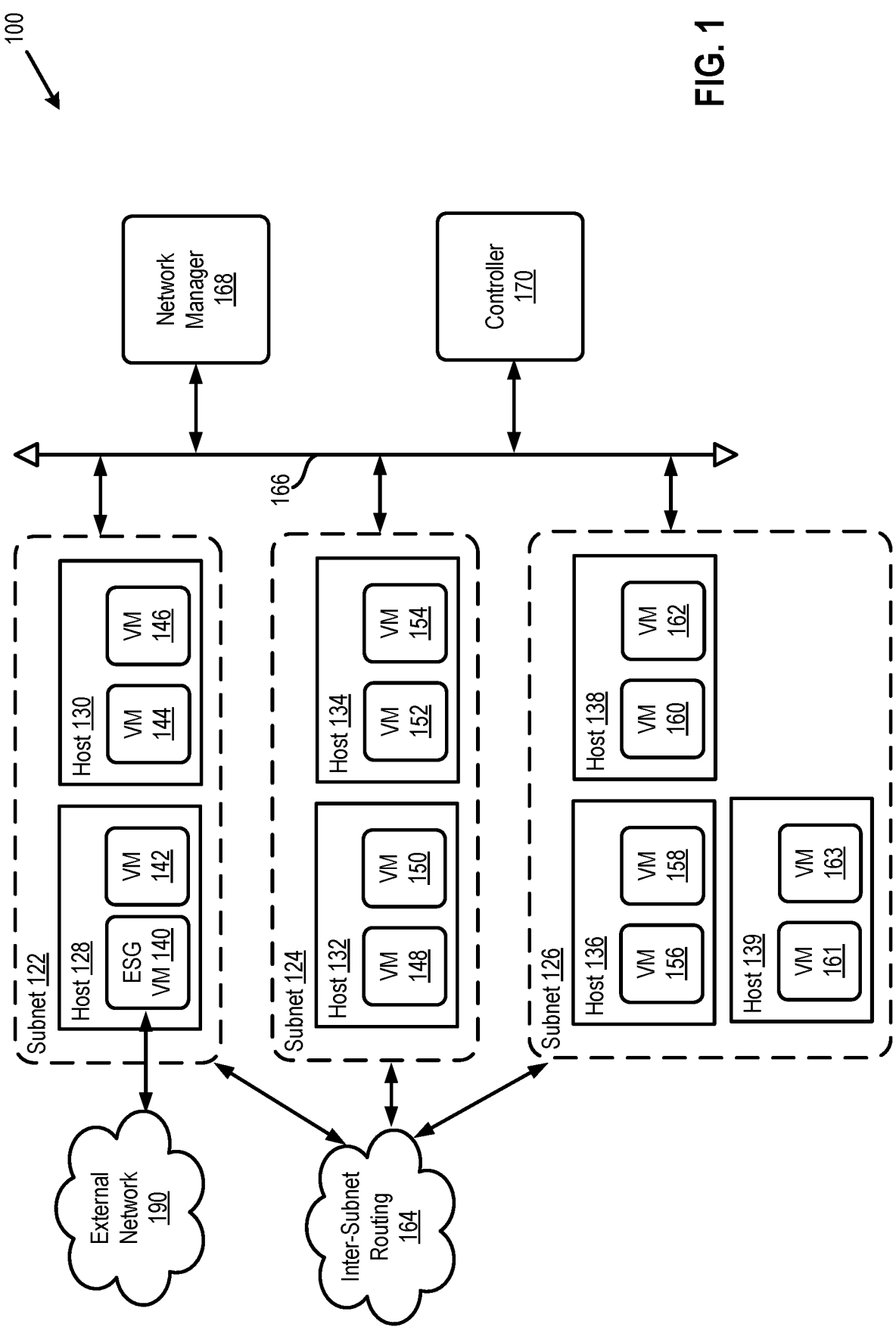
FIG. 1 depicts a block diagram of physical and virtual components of a network in which one or more embodiments of the present disclosure may be utilized.

FIG. 1 is a block diagram depicting physical and virtual components of a network 100, in which one or more embodiments of the present disclosure may be utilized. FIG. 1 is described in conjunction with FIG. 2, which depicts an example host.

Network 100 is divided into one or more subnets 122-126. A subnet may be defined as a logical subdivision of a network, such that the nodes within the subdivision do not need to communicate through a router. Within the same subnet, endpoints may be addressed with a common, identical, most-significant bit-group in their IP address. A network with subnets typically has IP addresses that may be divided into two fields: (1) a network number or routing prefix, and (2) the rest field or host identifier. For example, host 128 and host 130, which are on the same subnet 122, which may be designated by 223.1.1.0/24 wherein hosts 128, 130 may have the IPv4 addresses 223.1.1.1 and 223.1.1.2, respectively, and may communicate with each other without sending packets through a router. The prefix identifies network number for hosts 128 and 130, which is 223.1.1, while the host identifier for host 128 is 1, and for host 130 is 2. It should be noted that a similar CIDR convention for identifying subnets is followed in IPv6. In addition, the principles described herein are not limited to a particular addressing scheme and may be applied in other addressing schemes in which subnets may be defined or inferred.

In some embodiments, a subnet may be a VLAN (Virtual Local Area Network) or an IP subnet inside a VLAN. In some embodiments, a VLAN contains only one IP subnet. In some embodiments, multiple IP subnets are allocated in a VLAN. In some embodiments, a network subnet includes a set of adjacent VLANs that have high bandwidth and/or low cost links between each other.

Subnets 122-126 of network 100 include a collection of hosts 128-139 running VMs 140-163. VMs 140-163 run on host machines 128-139 via hypervisors running on those host machines. An exemplary host is described below with reference to FIG. 2. Hosts 128-139 are communicatively connected to a physical or "underlay" network. As used herein, the term "underlay" is synonymous with "physical" and refers to physical components of network 100. As used herein, the term "overlay" is used synonymously with "logical" and refers to the logical network implemented within network 100.

In some embodiments, each subnet 122-126 is able to support multicast traffic between the encompassed hosts 128-139. In some embodiments, at least some of the subnets 122-126 do not support multicast traffic and must rely on unicast to replicate and forward multicast packets to each receiver endpoint in a multicast group.

On network 100, a "multicast group" is comprised of VMs 140-163 or a subset of VMs 140-163. A multicast group is designated by a multicast IP address. A multicast IP address is assigned by controller 170, and controller 170 keeps track of membership within a multicast group, as further discussed below.

Network 100 includes a controller 170 that collects and distributes information about the network from and to endpoints in the network. Controller 170 may be a component of a control plane that is implemented as a physical appliance, a virtual machine on one of hosts 128-139, a cluster of physical computers and or virtual machines, or in a distributed fashion. Controller 170 communicates with hosts 128-139 via management network 166. In some embodiments, controller 170 is a central controller for all subnets of network 100. Controller 170 collects, stores, and/or distributes to endpoints information about membership within multicast groups of network 100. In some embodiments, controller 170 includes one or more computing devices that collect information submitted from individual hosts 128-139 and store the collected information as tables or directories for multicast groups. In some embodiments, controller 170 receives and distributes such information through the physical infrastructure of network 100.

In some embodiments, controller 170 communicates with individual hosts 128-139 through control plane protocols. In some other embodiments, the communication between controller 170 and individual endpoints in different subnets 122-126 takes place in communication pathways that are independent of network 100. In some embodiments, controller 170 selects a subnet proxy endpoint for each subnet for each multicast group based on the information collected by controller 170. In some embodiments, hosts 128-139 themselves select their own multicast subnet proxy endpoint based on the information distributed to them by controller 170.

A "subnet proxy endpoint" is an endpoint within a subnet that receives all multicast traffic, for a particular multicast group, destined for the subnet within which the subnet proxy endpoint is located. In an embodiment, a "subnet proxy endpoint" may be fixed within each subnet 122-126 for all multicast traffic. In other embodiment, a subnet proxy endpoint may be chosen dynamically by sender, controller 170, or another component or set of components within network 100. Subnet proxy endpoints, also referred to as multicast tunnel endpoints (MTEPs), are described in more detail in U.S. Pat. No. 10,218,523, issued Feb. 26, 2019 and entitled "Using a Central Controller Cluster to Configure a Distributed Multicast Logical Router," and co-pending U.S. patent application Ser. No. 15/868,871, filed Jan. 11, 2018 and entitled "Methods to Optimize Multicast Routing in Overlay Networks," the contents of which are incorporated herein by reference in their entirety. Furthermore, a detailed description of how multicast packet routing may be implemented within network 100, as well as a detailed description of methods of choosing a subnet proxy endpoint, is provided in U.S. Pat. No. 9,432,204, issued Aug. 30, 2016 and entitled "Distributed Multicast by Endpoints," which is incorporated herein by reference in its entirety.

In an embodiment, multicast IP addresses are assigned by controller 170 from a range of multicast IP addresses, such as 224.0.0.0 to 239.0.0.0, and any IP address within that range is known by components of network 100 to be a multicast IP address. For example, if VMs 142, 148, and 156 are all within the multicast IP group of 225.1.2.0, then any packet sent to IP address 225.1.2.0 will reach all endpoints within that group, namely VMs 142, 148, and 156 on hosts 128, 132, and 136.

Inter-subnet routing 164 is a set of network components that provide communication pathways among subnets 122-126. In an embodiment, inter-subnet routing 164 qaincludes at least one router (not shown). Data traffic between the subnets 122-126 flows through inter-subnet routing 164, and in an embodiment, inter-subnet routing 164 comprises the "data path" of network 100 while network 166 comprises the "control path" of network 100.

Although certain embodiments are described herein with respect to VMs, the same principals and techniques may also apply to other appropriate virtual computing instances (e.g., containers (e.g., Docker containers), data compute nodes, isolated user space instances, namespace containers, etc.).

Network 100 includes a management component, depicted in FIG. 1 as network manager 168, that may communicate with the one or more hosts 128-139 via network 166, which may be referred to as a management network, and may comprises multiple switches, routers, etc., not shown. In one embodiment, network manager 168 is a computer program that executes in a central server in network 100, or alternatively, network manager 168 may run in a VM, e.g. in one of hosts 128-139. Network manager 168 is configured to receive inputs from an administrator or other entity, e.g., via a web interface or API, and carry out administrative tasks for network 100, including centralized network management and providing an aggregated system view for a user. For example, the network manager 168 may generate virtualized network resources such as a logical distributed router (LDR) and/or an edge services gateway (ESG).

ESG VM 140 is a VM that is configured to operate as a gateway device. A gateway device provides VMs 140-163 with connectivity to one or more networks that are external to network 100 (e.g., a direct link, a local area network (LAN), a wide area network (WAN) such as the Internet, another type of network, or a combination of these). As shown in FIG. 1, ESG VM 140 provides connectivity to external network 190, which is a network outside of network 100. In certain embodiments, external network 190 represents a separate logical network, a separate physical network, a separate data center, or another network that is separate from network 100. For example, the gateway device may manage external public IP addresses for VMs 140-163 and route traffic incoming to network 100 from external network 190 and outgoing from network 100 to external network 190. The gateway device also provides other networking services, such as firewalls, network address translation (NAT), dynamic host configuration protocol (DHCP), and load balancing. In the example of FIG. 1, the gateway device is implemented as a VCI (e.g., VM), that is configured to execute on host 128, which is shown as ESG VM 140.

Figure 2:
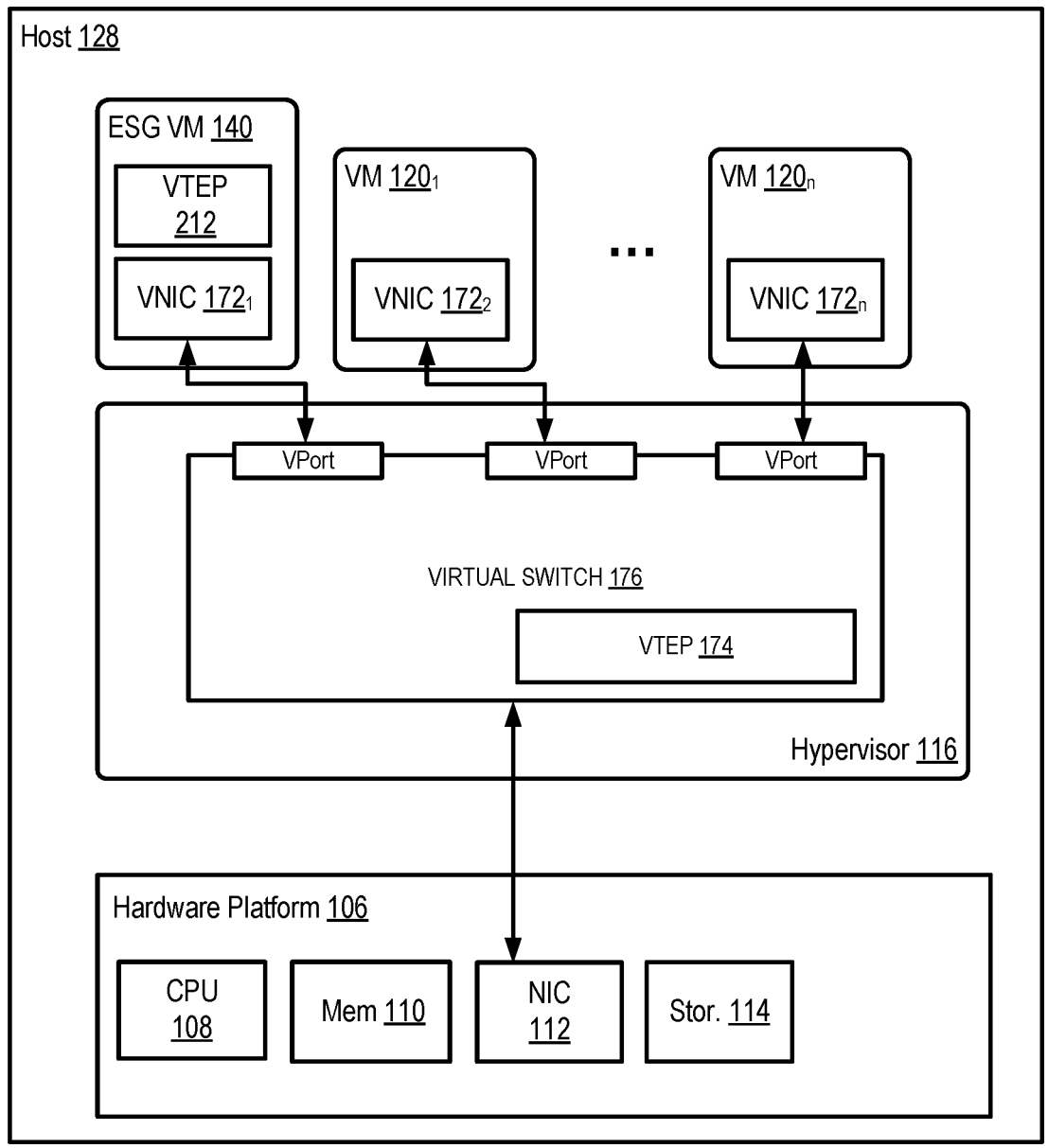
FIG. 2 depicts a block diagram of an example host, according to an embodiment.

FIG. 2 includes host 128 of FIG. 1. Other hosts 130-139 may include similar components. Host 128 may be constructed on a server grade hardware platform 106, such as an x86 architecture platform. As shown in FIG. 2, hardware platform 106 of host 128 includes one or more processors (CPUs) 108, system memory 110, a physical network interface 112, storage system 114. In addition, host 128 may include other I/O devices such as, for example, a USB interface (not shown). CPU 108 is configured to execute instructions, for example, executable instructions that perform one or more operations described herein and may be stored in memory 110 and in local storage 114. Memory 110 is a device allowing information, such as executable instructions, cryptographic keys, virtual disks, configurations, and other data, to be stored and retrieved. Memory 110 is where programs and data are kept when the processor is actively using them. Memory 110 may be a byte-addressable, random access memory, and memory 110 may include, for example, one or more random access memory (RAM) modules. Physical network interface 112 enables host 128 to communicate with another device (e.g., other hardware computing platforms, entities, or host machines) via a communication medium, such as via network 100, inter-subnet routing 164, and/or external networks such as external network 190. Network interface 112 may be one or more network adapters, also sometimes referred to as Network Interface Cards (NICs). Storage system 114 represents one or more persistent storage devices (e.g., one or more hard disks, flash memory modules, solid state disks, and optical disks) in host 128.

As shown, ESG VM 140 comprises a virtual tunnel endpoint (VTEP) 212 used by ESG VM 140 for its communication with VMs in the logical overlay network. For example, VTEP 212 may be associated with software components, or it may itself, provide Layer 2 tunneling services for encapsulating egress packets from ESG VM 140 directed to other VMs and decapsulating ingress packets from other VMs to ESG VM 140. Other traffic communicated by ESG VM 140, such as with destinations on external networks such as external network 190, may not be encapsulated/decapsulated using VTEP 212.

As shown, host 128 is configured to provide a virtualization layer that abstracts processor, memory, storage, and networking resources of hardware platform 106 into multiple virtual machines 1201 to 120*n* (collectively referred to as VMs 120) and ESG VM 140 that run concurrently on the same host. VMs 140-163 of FIG. 1 may be among ESG VM 140 and VMs 1201 to 120*n* of FIG. 2. ESG VM 140 and VMs 120 run on top of a software interface layer, referred to herein as a hypervisor 116, that enables sharing of the hardware resources of host 128 by VMs 120. Hypervisor 116 may run on top of the operating system of host 128 or directly on hardware components of host 128.

Hypervisor 116 includes a virtual switch 176, which serves as an interface between the hosted virtual machines 136 and 120, NIC 112, as well as other physical resources available on exemplary host 128. Hypervisor 116 further includes a hypervisor-based Virtual Extensible Local Area Network (VXLAN) tunnel endpoint (VTEP) 174 which may be implemented in software in conjunction with virtual switch 176. Accordingly, in some embodiments, VTEP 174 is responsible for providing VTEP services for each of the VMs 120 on the same host 128 as VTEP 174. It might be worth noting that edge services gateway VM 140 includes a VNIC 172$_1$ that is not attached to an overlay network and therefore may be addressable from the physical underlay network. As such, when an encapsulated packet is directed to VNIC 172$_1$, ESG 140 is responsible for decapsulating it, and for encapsulating packets directed to VMs on different hosts within the datacenter. Packets exiting ESG VM 140 destined for a physical network or to a gateway connected to an external WAN network are may not be encapsulated.

In alternate embodiments, virtual switch 176, VTEP 174, and/or physical device drivers may execute in a privileged virtual machine often referred to as a "Domain zero", "root-", or "parent-partition." Each of the virtual machines 136 and 120 includes a virtual network interface card (VNIC) 172, which is responsible for exchanging packets between the virtual machine and hypervisor 116. VNICs 172 may be, in some cases, a software abstraction of a physical network interface card. Each virtual machine 136 and 120 is connected to a virtual port (vport) provided by virtual switch 176, and virtual switch 176 is connected to physical network interface 112 to allow network traffic to be exchanged between virtual machines executing on host 128 and other network destinations such as virtual machines hosted by other host machines (e.g., host machines 128-139).

Presence of a logical, overlay network connecting VMs allows for creation of "overlay" multicast groups and "underlay" multicast groups, as well as for mapping between an "overlay" multicast IP address and a physical "underlay" multicast IP address. An overlay multicast group is a multicast group whose members are VMs, and an underlay multicast group is a multicast group whose members are physical hosts (e.g., VTEPs). An overlay multicast group may also be a separate VXLAN network that maps to a physical underlay multicast group. For broadcast, unknown unicast, and multicast traffic inside a logical network, VXLAN leverages IP multicast. Overlay multicast groups and underlay multicast groups are described in more detail in co-pending U.S. patent application Ser. No. 16/299,697, filed Aug. 20, 2019 and entitled "Deploying a Software Defined Networking (SDN) Solution on a Host Using a Single Active Uplink," which is incorporated herein by reference in its entirety.

All multicast packets sent to endpoints within network 100 from external networks such as external network 190 are received by ESG VM 140. As such, if ESG VM 140 replicates every multicast packet to every host in network 100 that includes an endpoint to which the multicast packet pertains, ESG VM 140 is at risk of becoming saturated. For example, if a given multicast group includes a large number of VMs 142-163, then ESG VM 140 could have to replicate every multicast packet directed to the given multicast group to a large number of hosts 130-139 or at least to one host in each subnet 122, 124, and 126 that includes a VM in the multicast group. Furthermore, while only three subnets 122, 124, and 126 and seven hosts 128-139 are depicted, network 100 may potentially include a much larger number of subnets and hosts. Accordingly, techniques described herein involve selecting, by ESG VM 140, a particular host as a replicator for each given multicast packet based on various criteria in order to distribute the load among hosts 128-139 and avoid saturation of ESG VM 140.

Figure 3:
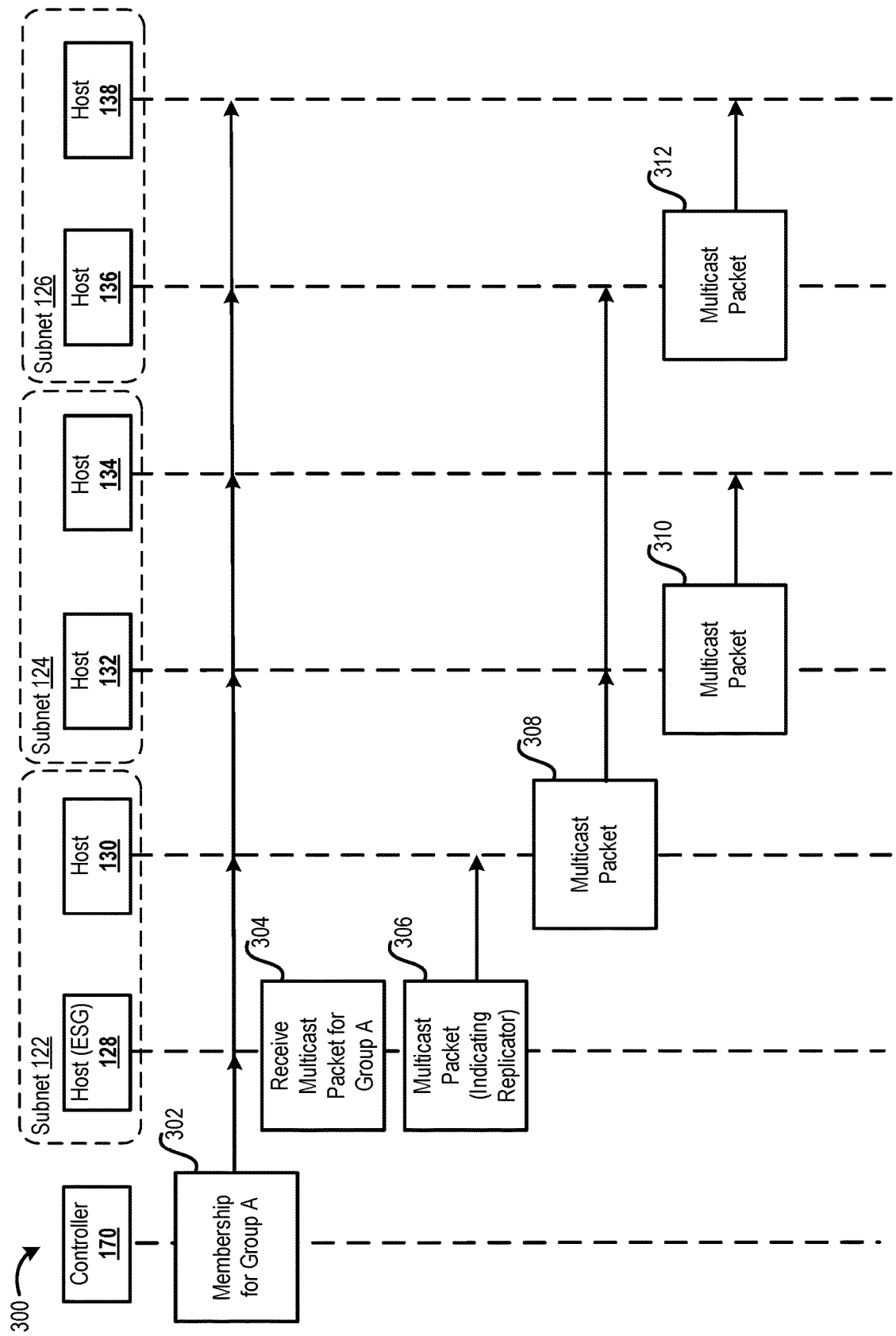
FIG. 3 depicts a block diagram of an example exchange of messages between network components, according to an embodiment.

FIG. 3 depicts a block diagram of an example 300 exchange of messages between network components, according to an embodiment. Example 300 includes controller 170, subnets 122, 124, and 126, and hosts 128-138 of FIG. 1.

At 302, controller 170 sends membership information for "Group A," which is a multicast group, to host (ESG) 128 (e.g., which is the host that runs ESG VM 140 of FIG. 1) and hosts 130-138. In certain embodiments, controller 170 has learned the membership information for Group A from the hosts that have VMs in Group A, and distributes the membership information to all hosts in network 100 of FIG. 1. In some cases, the membership information includes identifiers such as addresses of all hosts in network 100 that include at least one VM in Group A. In example 300, the membership information for Group A indicates that each of hosts 130, 132, 134, 136, and 138 includes at least one VM in Group A.

At 304, host (ESG) 128 receives a multicast packet for Group A. In an example, host (ESG) 128 receives the multicast packet from a network external to network 100 of FIG. 1, such as external network 190 of FIG. 1. ESG VM 140 of FIG. 1 within host (ESG) 128 then selects a host as a replicator for the multicast packet based on one or more of a variety of factors. The factors can include, for example, whether a given host has a VM in the multicast group, distance such as a number of network hops between the given host and host (ESG) 128, load at the given host, and/or the like. In some embodiments, each host 128-138 provides its current load at regular intervals to controller 170, and controller 170 distributes the load information for each host 128-138 to all hosts 128-138.

In one example, ESG VM 140 of FIG. 1 selects a replicator host that has a VM (e.g., a greatest number of VMs) in the multicast group. In another example, ESG VM 140 of FIG. 1 selects a host with a fewest number of network hops from host (ESG) 128 as the replicator host. In another example, ESG VM 140 of FIG. 1 selects a host with a lowest amount of load as the replicator host. In some cases, multiple factors (e.g., assigned different weights) are used in conjunction to select a replicator host. For example, a normalized score may be calculated for each given host based on weighted values for each factor, and the host with the highest or lowest normalized score may be selected as the replicator host. In example 300, ESG VM 140 of FIG. 1 selects host 130 as the replicator for the multicast packet.

At 306, host (ESG) 128 sends the multicast packet to host 130 along with an indication that host 130 is the replicator for the multicast packet. The indication may be, for example, included as metadata in a header with which ESG VM 140 of FIG. 1 encapsulates the multicast packet. In some embodiments, host (ESG) 128 sends the multicast packet to host 130 via unicast and does not send the multicast packet to any other hosts.

At 308, host 130 sends the multicast packet to hosts 132 and 136. In certain embodiments, host 130 uses the membership information for Group A received from controller 170 at 302 to determine which hosts have VMs in Group A. In example 300, host 130 sends the multicast packet to one host in each subnet (e.g., a subnet proxy endpoint) that has a VM in Group A. Subsequently, at 310 and 312, the proxy endpoints (hosts 132 and 136) replicate the multicast packet to other hosts in their respective subnets (hosts 134 and 138) that have VMs in Group A.

In certain embodiments, different hosts are selected as replicators for different multicast packets received by host (ESG) 128. As such, the load associated with replicating multicast packets is distributed across different hosts in network 100 of FIG. 1, and techniques described herein prevent host (ESG) 128 from being saturated or overly congested.

Figure 4:
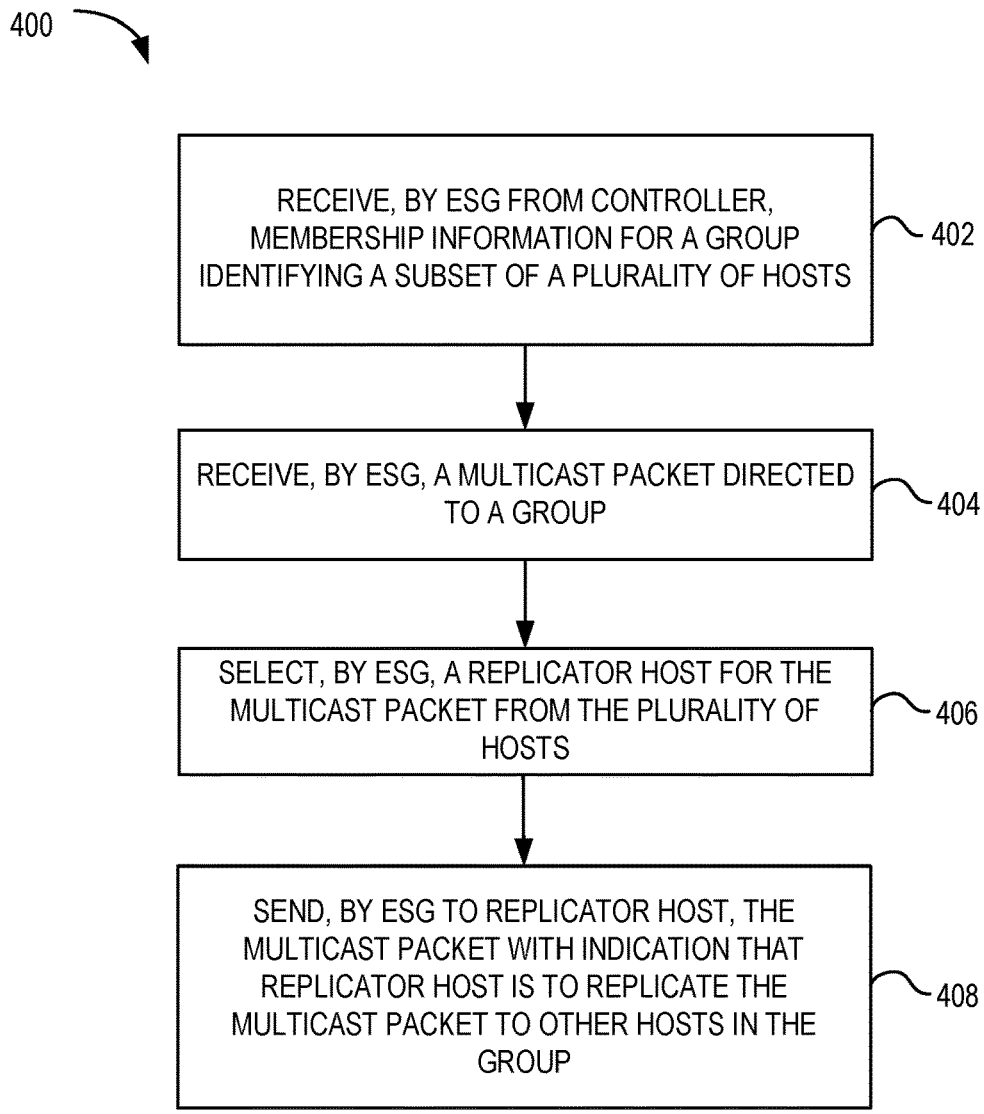
FIG. 4 depicts a flow diagram of a method of reducing network congestion.

FIG. 4 depicts a flow diagram of a method 400 of reducing network congestion. In an example, method 400 is performed by ESG VM 140 of FIG. 1.

At step 402, an ESG receives, from a controller, membership information for a group identifying a subset of a plurality of hosts. In certain embodiments, ESG VM 140 of FIG. 1 receives the membership information from controller 170 of FIG. 1, and the membership information includes identifiers such as addresses of all hosts within network 100 of FIG. 1 that include one or more VMs belonging to the group. In some embodiments, the controller, the ESG, and the plurality of hosts are part of an overlay network.

At step 404, the ESG receives a multicast packet directed to a group. For example, the ESG may receive the multicast packet from a source outside of the overlay network on which the ESG is located, such as a different overlay network, an underlay network, a different data center or the like. In one example, the multicast packet is received from external network 190 of FIG. 1.

At step 406, the ESG selects a replicator host for the multicast packet from the plurality of hosts. In an example, ESG VM 140 selects the replicator host based on one or more of a variety of factors. The factors may include, for example, whether the replicator host comprises a VM that is a member of the group, a number of network hops between the ESG and the replicator host, a load on the replicator host, and/or the like. In some embodiments, the controller receives load information from each of the plurality of hosts, and provides the load information to all of the plurality of hosts. The ESG may receive the load of the replicator host from the controller and compare the load of the replicator host to loads of other hosts. Some examples involve using multiple factors with different weights to select the replicator host.

At step 408, the ESG sends, to the replicator host, the multicast packet with an indication that the replicator host is to replicate the multicast packet to other hosts in the group (e.g., by sending the multicast packet to at least one given host in each given subnet that contains a remaining host with a VM in the group). In certain embodiments, the indication is included as metadata in a header with which ESG VM 140 of FIG. 1 encapsulates the multicast packet. The header may also include an address of the replicator host.

In some embodiments, the replicator host receives the multicast packet and determines based on the header that it is to replicate the multicast packet further. The replicator host then uses the membership information for the group received from the controller to determine which hosts to send the multicast packet to. In some embodiments, the replicator host sends the multicast packet to one host in each subnet of a plurality of subnets that include VMs in the group, and these hosts then replicate the packet further within their respective subnets.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of reducing congestion within a network, the network comprising a plurality of subnets, the plurality of subnets comprising a plurality of host machines and a plurality of virtual computing instances (VCIs) running on the plurality of host machines, the method comprising:
   receiving, by an edge services gateway of a first subnet of the plurality of subnets, membership information for a group, wherein the membership information identifies a subset of the plurality of host machines;
   receiving, by the edge services gateway, a multicast packet directed to the group;
   selecting, by the edge services gateway, from the plurality of host machines, a replicator host machine for the multicast packet; and
   sending, by the edge services gateway, to the replicator host machine, the multicast packet along with metadata indicating that the replicator host machine is to replicate the multicast packet to remaining host machines of the subset of the plurality of host machines identified in the membership information for the group by, for each given subnet of the plurality of subnets that contains a remaining host machine of the remaining host machines, sending the multicast packet to at least one given host machine of the plurality of host machines that is located in the given subnet.

2. The method of claim 1, wherein selecting, by the edge services gateway, the replicator host machine for the multicast packet is based on one or more criteria selected from:
   whether the replicator host machine is included in the subset of the plurality of host machines identified in the membership information for the group;
   a number of hops between the edge services gateway and the replicator host machine; or
   a current load of the replicator host machine.

3. The method of claim 2, wherein the one or more criteria are associated with respective weights, and wherein the replicator host machine is selected based further on the respective weights.

4. The method of claim 2, wherein the current load of the replicator host machine is received by the edge services gateway from a controller and compared to current loads of other host machines of the plurality of host machines.

5. The method of claim 1, wherein the metadata is an encapsulation header that is added to the multicast packet by the edge services gateway, and wherein the encapsulation header further includes an address of the replicator host machine.

6. The method of claim 1, wherein the edge services gateway does not send the multicast packet to any other host machine of the plurality of host machines other than the replicator host machine.

7. The method of claim 1, wherein the network comprises an overlay domain, and wherein the edge services gateway receives the multicast packet from a network outside of the overlay domain.

8. A computer system, comprising:
   one or more processors; and
   a non-transitory computer readable medium comprising instruction that, when executed by the one or more processors, cause the computer system to perform a method of reducing congestion within a network, the network comprising a plurality of subnets, the plurality of subnets comprising a plurality of host machines and a plurality of virtual computing instances (VCIs) running on the plurality of host machines, the method comprising:
     receiving, by an edge services gateway of a first subnet of the plurality of subnets, membership information for a group, wherein the membership information identifies a subset of the plurality of host machines;
     receiving, by the edge services gateway, a multicast packet directed to the group;
     selecting, by the edge services gateway, from the plurality of host machines, a replicator host machine for the multicast packet; and
     sending, by the edge services gateway, to the replicator host machine, the multicast packet along with metadata indicating that the replicator host machine is to replicate the multicast packet to remaining host machines of the subset of the plurality of host machines identified in the membership information for the group by, for each given subnet of the plurality of subnets that contains a remaining host machine of the remaining host machines, sending the multicast packet to at least one given host machine of the plurality of host machines that is located in the given subnet.

9. The computer system of claim 8, wherein selecting, by the edge services gateway, the replicator host machine for the multicast packet is based on one or more criteria selected from:
- whether the replicator host machine is included in the subset of the plurality of host machines identified in the membership information for the group;
- a number of hops between the edge services gateway and the replicator host machine; or
- a current load of the replicator host machine.

10. The computer system of claim 9, wherein the one or more criteria are associated with respective weights, and wherein the replicator host machine is selected based further on the respective weights.

11. The computer system of claim 9, wherein the current load of the replicator host machine is received by the edge services gateway from a controller and compared to current loads of other host machines of the plurality of host machines.

12. The computer system of claim 8, wherein the metadata is an encapsulation header that is added to the multicast packet by the edge services gateway, and wherein the encapsulation header further includes an address of the replicator host machine.

13. The computer system of claim 8, wherein the edge services gateway does not send the multicast packet to any other host machine of the plurality of host machines other than the replicator host machine.

14. The computer system of claim 8, wherein the network comprises an overlay domain, and wherein the edge services gateway receives the multicast packet from a network outside of the overlay domain.

15. A non-transitory computer readable medium comprising instructions that, when executed by a processor of a computer system, cause the computer system to perform a method of reducing congestion within a network, the network comprising a plurality of subnets, the plurality of subnets comprising a plurality of host machines and a plurality of virtual computing instances (VCIs) running on the plurality of host machines, the method comprising:
- receiving, by an edge services gateway of a first subnet of the plurality of subnets, membership information for a group, wherein the membership information identifies a subset of the plurality of host machines;
- receiving, by the edge services gateway, a multicast packet directed to the group;
- selecting, by the edge services gateway, from the plurality of host machines, a replicator host machine for the multicast packet; and
- sending, by the edge services gateway, to the replicator host machine, the multicast packet along with metadata indicating that the replicator host machine is to replicate the multicast packet to remaining host machines of the subset of the plurality of host machines identified in the membership information for the group by, for each given subnet of the plurality of subnets that contains a remaining host machine of the remaining host machines, sending the multicast packet to at least one given host machine of the plurality of host machines that is located in the given subnet.

16. The non-transitory computer readable medium of claim 15, wherein selecting, by the edge services gateway, the replicator host machine for the multicast packet is based on one or more criteria selected from:
- whether the replicator host machine is included in the subset of the plurality of host machines identified in the membership information for the group;
- a number of hops between the edge services gateway and the replicator host machine; or
- a current load of the replicator host machine.

17. The non-transitory computer readable medium of claim 16, wherein the one or more criteria are associated with respective weights, and wherein the replicator host machine is selected based further on the respective weights.

18. The non-transitory computer readable medium of claim 16, wherein the current load of the replicator host machine is received by the edge services gateway from a controller and compared to current loads of other host machines of the plurality of host machines.

19. The non-transitory computer readable medium of claim 15, wherein the metadata is an encapsulation header that is added to the multicast packet by the edge services gateway, and wherein the encapsulation header further includes an address of the replicator host machine.

20. The non-transitory computer readable medium of claim 15, wherein the edge services gateway does not send the multicast packet to any other host machine of the plurality of host machines other than the replicator host machine.

* * * * *